(12) United States Patent
Choi et al.

(10) Patent No.: US 8,818,425 B1
(45) Date of Patent: Aug. 26, 2014

(54) SYNCHRONIZATION OF PAGING AND SLEEP CYCLES IN WIRELESS COMMUNICATION SYSTEMS

(75) Inventors: Jihwan P. Choi, San Jose, CA (US); Jungwon Lee, San Diego, CA (US)

(73) Assignee: Marvell International Ltd., Hamilton (BM)

( * ) Notice: Subject to any disclaimer, the term of this patent is extended or adjusted under 35 U.S.C. 154(b) by 910 days.

(21) Appl. No.: 12/917,117

(22) Filed: Nov. 1, 2010

Related U.S. Application Data

(60) Provisional application No. 61/262,868, filed on Nov. 19, 2009.

(51) Int. Cl.
*H04W 68/00* (2009.01)

(52) U.S. Cl.
USPC ........ 455/458; 455/343.2; 455/515; 455/574; 370/252; 370/311; 370/318; 340/7.1; 340/7.21; 340/7.28; 340/7.32; 340/7.34

(58) Field of Classification Search
USPC .................. 455/127.1, 127.5, 458, 574, 13.4, 455/343.2, 343.3, 343.4, 515; 370/252, 370/311, 318; 340/7.1, 7.21, 7.28, 7.32, 340/7.33, 7.34
See application file for complete search history.

(56) References Cited

U.S. PATENT DOCUMENTS

| 5,991,635 | A | * | 11/1999 | Dent et al. | 455/517 |
| 2008/0254814 | A1 | * | 10/2008 | Harris et al. | 455/458 |
| 2010/0279714 | A1 | * | 11/2010 | Chin et al. | 455/458 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.10.0 Technical Specification, 3GPP, Valbonne France, pp. 1-147 (Sep. 2009).

"3rd Generation Partnership Project; Technical Specification Group Radio Access Network; Evolved Universal Terrestrial Radio Access (E-UTRA); User Equipment (UE) procedures in idle mode (Release 8)," 3GPP TS 36,304 V8.7.0 Technical Specification, 3GPP, Valbonne France, pp. 1-30 (Sep. 2009).

"3rd Generation Partnership Project; Technical Specification Group Radio Access Network; Evolved Universal Terrestrial Radio Access (E-UTRA) Medium Access Control (MAC) protocol specification (Release 8)," 3GPP TS 36.321 V8.7.0 Technical Specification, 3GPP, Valbonne France, pp. 1-47 (Sep. 2009).

"3rd Generation Partnership Project; Technical Specification Group Radio Access Network; Evolved Universal Terrestrial Radio Access (E-UTRA) Radio Resource Control (RRC); Protocol specification (Release 8)," 3GPP TS 36.331 V8.7.0 Technical Specification, 3GPP, Valbonne France, pp. 1-208 (Sep. 2009).

* cited by examiner

*Primary Examiner* — Anthony Addy
*Assistant Examiner* — Edd Rianne Plata

(57) ABSTRACT

Apparatus having corresponding methods and computer-readable media comprise: a paging module configured to provide paging parameters for a mobile station, wherein the paging parameters include i) a paging listening interval length Lp for each paging listening interval, ii) a paging cycle period Pp, and iii) a paging cycle offset Qp; and a sleep module configured to determine sleep parameters for the mobile station based on the paging parameters, wherein the sleep parameters include i) a wakeup interval length Ls for each wakeup interval, ii) a sleep cycle period Ps, and iii) a sleep cycle offset Qs; and wherein the sleep module is further configured to determine the sleep parameters such that each paging listening interval overlaps one of the wakeup intervals.

19 Claims, 6 Drawing Sheets

SYNCHRONIZATION OF PAGING AND SLEEP CYCLES IN WIRELESS COMMUNICATION SYSTEMS

CROSS-REFERENCE TO RELATED APPLICATIONS

This disclosure claims the benefit of U.S. Provisional Patent Application Ser. No. 61/262,868, filed on Nov. 19, 2009, the disclosure thereof incorporated by reference herein in its entirety.

FIELD

The present disclosure relates generally to wireless communication systems. More particularly, the present disclosure relates to synchronization of paging and sleep cycles in wireless communication systems.

BACKGROUND

Mobile stations in wireless communications systems are generally powered by batteries. For this reason, manufacturers strive to reduce power consumption of mobile stations to enable the devices to be used for longer periods without replacing or recharging the batteries, for example by including idle modes, sleep modes, and the like.

In idle mode, a mobile station disconnects from a specific base station, but listens to periodic paging messages during paging listening intervals. The paging messages are broadcast by base stations in order to notify mobile stations of the arrival of downlink traffic and the like.

In sleep mode, a mobile station maintains a connection with a base station, but powers off except for periodic wakeup intervals. During each wakeup interval, a mobile station may decode broadcast messages, receive downlink packets, transmit uplink packets, measure base station signals, and the like.

In some wireless communications systems, such as WiMAX systems, the idle and sleep modes cannot be active at the same time. However, other wireless communications systems, such as 3GPP LTE, permit a mobile station to operate in both modes at the same time.

SUMMARY

In general, in one aspect, an embodiment features an apparatus comprising: a paging module configured to provide paging parameters for a mobile station, wherein the paging parameters include i) a paging listening interval length Lp for each paging listening interval, ii) a paging cycle period Pp, and iii) a paging cycle offset Qp; and a sleep module configured to determine sleep parameters for the mobile station based on the paging parameters, wherein the sleep parameters include i) a wakeup interval length Ls for each wakeup interval, ii) a sleep cycle period Ps, and iii) a sleep cycle offset Qs; and wherein the sleep module is further configured to determine the sleep parameters such that each paging listening interval overlaps one of the wakeup intervals.

In general, in one aspect, an embodiment features a method comprising: providing paging parameters for a mobile station, wherein the paging parameters include i) a paging listening interval length Lp for each paging listening interval, ii) a paging cycle period Pp, and iii) a paging cycle offset Qp; and determining sleep parameters for the mobile station based on the paging parameters, wherein the sleep parameters include i) a wakeup interval length Ls for each wakeup interval, ii) a sleep cycle period Ps, and iii) a sleep cycle offset Qs; and wherein the sleep parameters are determined such that each paging listening interval overlaps one of the wakeup intervals.

In general, in one aspect, an embodiment features computer-readable media embodying instructions executable by a computer to perform a method comprising: providing paging parameters for a mobile station, wherein the paging parameters include i) a paging listening interval length Lp for each paging listening interval, ii) a paging cycle period Pp, and iii) a paging cycle offset Qp; and determining sleep parameters for the mobile station based on the paging parameters, wherein the sleep parameters include i) a wakeup interval length Ls for each wakeup interval, ii) a sleep cycle period Ps, and iii) a sleep cycle offset Qs; and wherein the sleep parameters are determined such that each paging listening interval overlaps one of the wakeup intervals.

The details of one or more implementations are set forth in the accompanying drawings and the description below. Other features will be apparent from the description and drawings, and from the claims.

Figure 1:
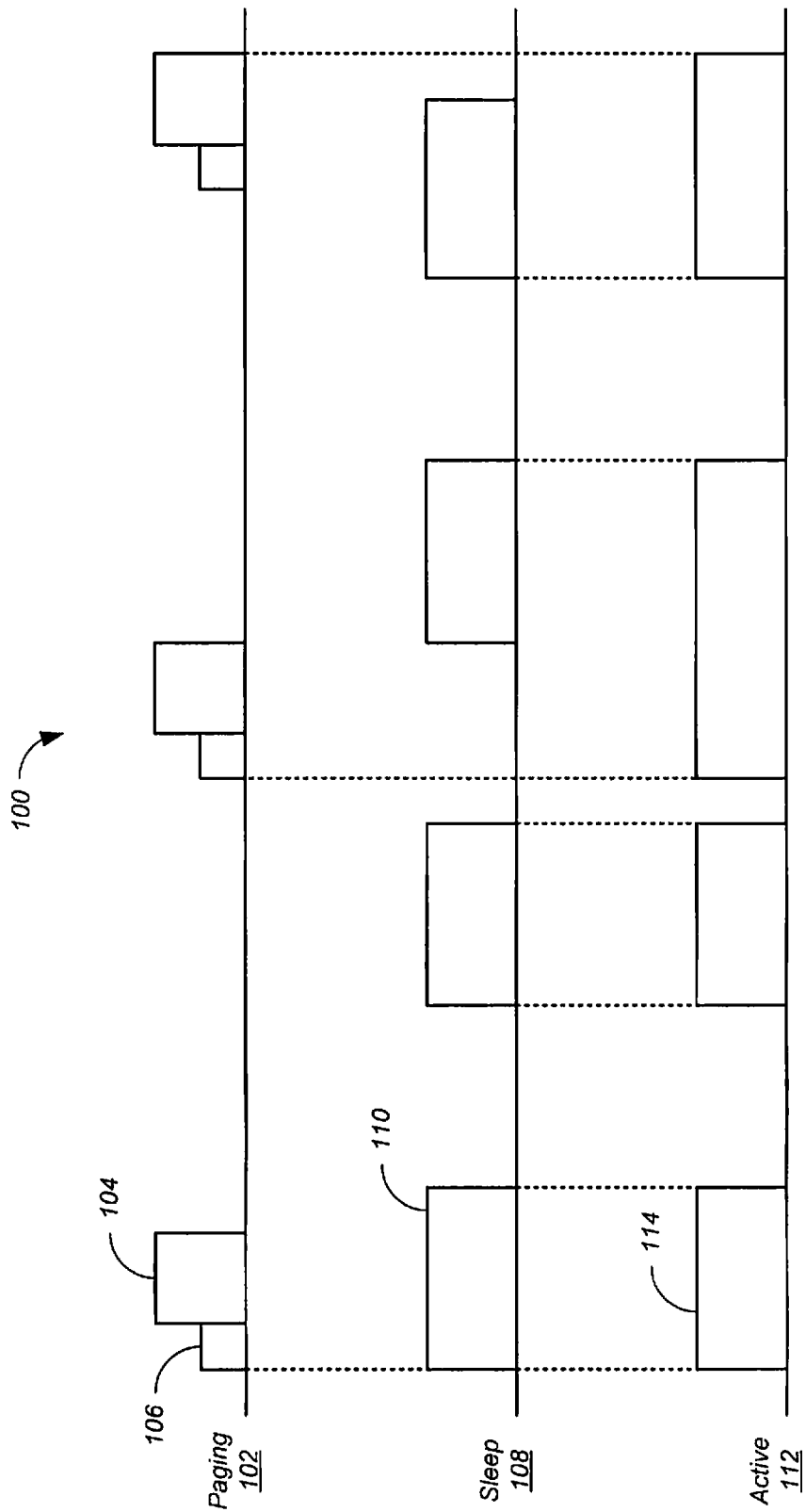
FIG. 1 shows a conventional wireless communication schedule.

The leading digit(s) of each reference numeral used in this specification indicates the number of the drawing in which the reference numeral first appears.

DETAILED DESCRIPTION

In conventional wireless communications systems that permit a mobile station to operate in sleep mode and idle mode contemporaneously, the paging cycles and sleep cycles are not coordinated. Therefore, a mobile station operating in both modes contemporaneously must be active during both paging listening intervals and wakeup intervals, which generally do not coincide. This problem is illustrated by schedule 100 of FIG. 1.

Referring to FIG. 1, schedule 100 includes a paging timeline 102 showing periodic paging listening intervals 104, each preceded by an initialization interval 106. Schedule 100 also includes a sleep timeline 108 showing periodic wakeup intervals 110. Schedule 100 also shows an active timeline 112 showing the union of paging listening intervals 104, initialization intervals 106, and wakeup intervals 110 as active intervals 114. As can be seen from FIG. 1, the active time represented by active timeline 112 is much greater than required by either paging timeline 102 or sleep timeline 108 alone.

The inventors have recognized that this situation presents a problem to be solved. The solutions disclosed herein involve synchronizing paging listening intervals 104 and wakeup intervals 110 so as to reduce the total active time required at the mobile station. In various embodiments, the sleep parameters for the mobile station are selected so that each paging listening interval 104 overlaps one of wakeup intervals 110. Furthermore, in some embodiments, the sleep parameters for the mobile station are selected so that the end of each paging listening interval 104 is aligned with the end of one of wakeup intervals 110. This alignment places some or all of each initialization interval 106 within one of wakeup intervals 110 as well.

These techniques provide numerous potential advantages. For example, battery power of the mobile station is conserved. As another example, the probability of the mobile station failing to receive paging messages from the base station is reduced. Therefore the processing delay is reduced in the case of the arrival of downlink data.

Figure 2:
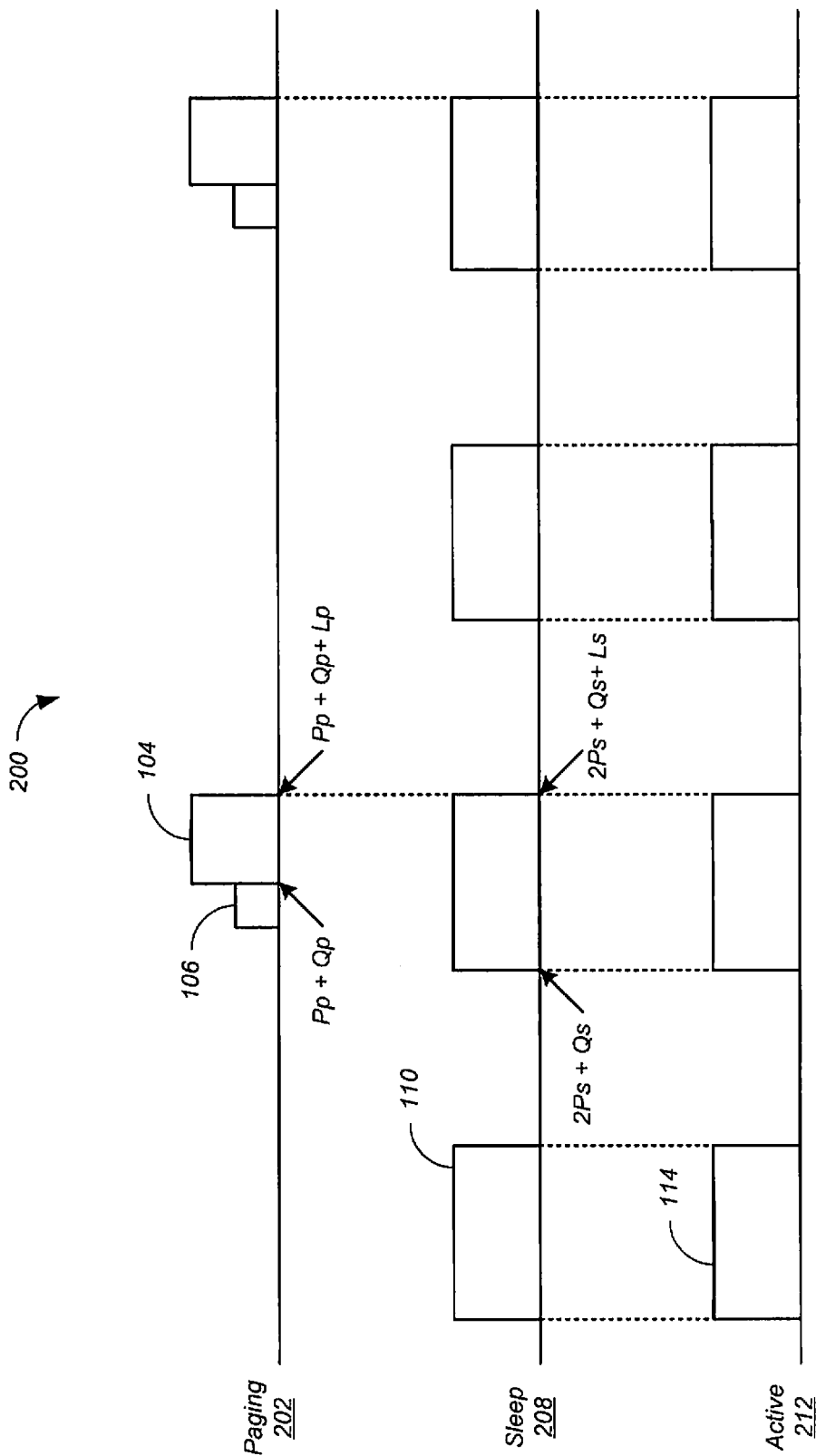
FIG. 2 shows a wireless communication schedule according to one embodiment.

FIG. 2 shows an example schedule 200 according to one embodiment. Referring to FIG. 2, it can be seen that paging timeline 202 and sleep timeline 208 are synchronized such that each paging listening interval 104 overlaps one of wakeup intervals 110. In addition, it can be seen that the end of each paging listening interval 104 is aligned with the end of one of wakeup intervals 110. This alignment places some or all of each initialization interval 106 within one of the wakeup intervals 110. As can be seen from schedule 200 FIG. 2, the active time represented by active timeline 212 is much less than that required by schedule 100 of FIG. 1.

FIG. 2 also illustrates parameters used to describe various embodiments. The equations given below assume a discrete time interval t, where t is a non-negative integer. Discrete time interval t can be interpreted subframe with a duration of 1 ms for LTE. The period of the paging cycle is given by $Pp \geq 0$. The offset of the paging cycle is given by $Qp \geq 0$. The length of the paging listening interval is given by $Lp \geq 0$. Then the paging listening interval is described by equation (1), where np is a non-negative integer indicating periodic occurrence of paging listening intervals.

$$Pp \cdot np + Qp \leq t < Pp \cdot np + Qp + Lp \qquad (1)$$

The period of the sleep cycle is given by $Ps \geq 0$. The offset of the sleep cycle is given by $Qs \geq 0$. The length of the wakeup interval is given by $Lp \geq 0$. Then the wakeup interval is described by equation (2), where ns is a non-negative integer indicating periodic occurrence of wakeup intervals.

$$Ps \cdot ns + Qs \leq t < Ps \cdot s + Qs + Ls \qquad (2)$$

Idle mode generally has a longer period and shorter interval than sleep mode, as shown in equations (3) and (4).

$$Pp \geq Ps \qquad (3)$$

$$Lp \leq Ls \qquad (4)$$

Now the selection of paging and sleep parameters is described in detail. In most cases, the paging parameters are set according to network requirements, Therefore, the sleep parameters are selected based on the paging parameters to synchronize idle and sleep modes. In some embodiments, the selection of sleep parameters is performed by the base station, which transmits the parameters to the mobile station. In other embodiments, the selection of sleep parameters is performed by the mobile station, which then transmits the parameters to the base station for confirmation. Both of these embodiments are described below.

Figure 3:
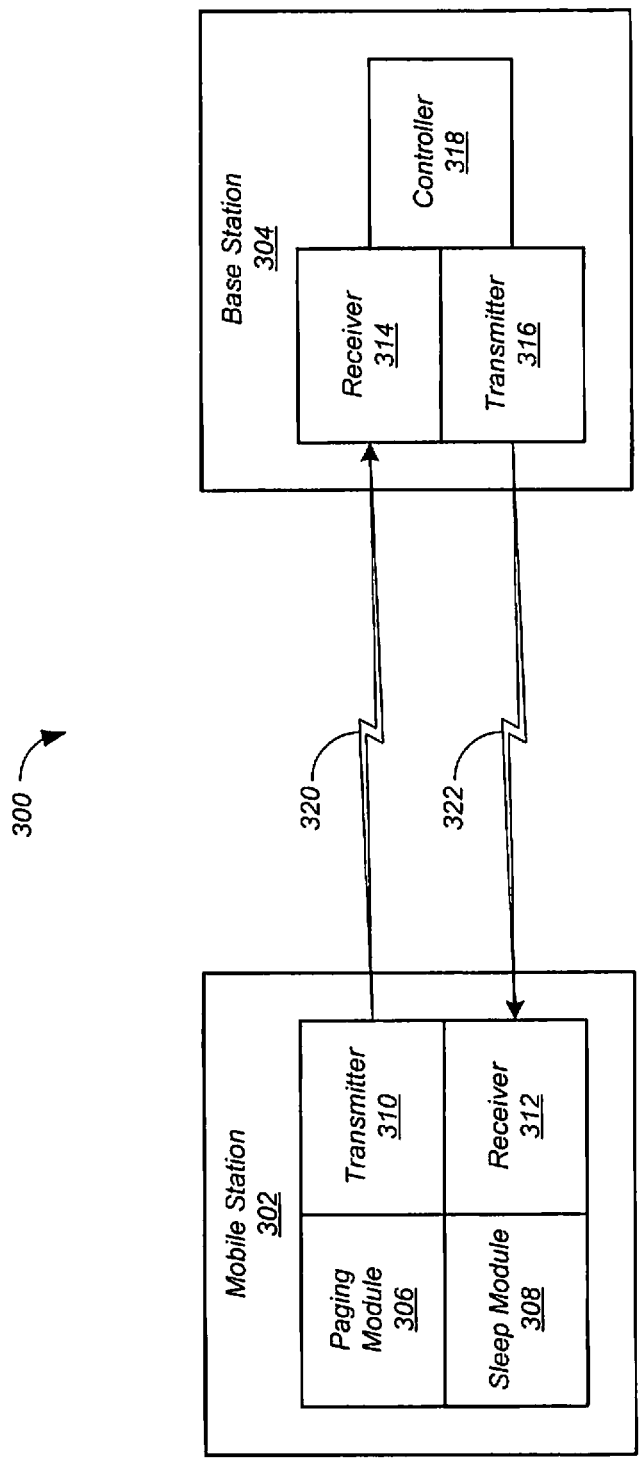
FIG. 3 shows elements of a wireless communication system according to an embodiment where a mobile station selects its sleep parameters.

FIG. 3 shows elements of a wireless communication system 300 according to an embodiment where a mobile station 302 selects its sleep parameters. Although in the described embodiments the elements of wireless communication system 300 are presented in one arrangement, other embodiments may feature other arrangements. For example, elements of wireless communication system 300 can be implemented in hardware, software, or combinations thereof. Furthermore, in some embodiments, wireless communication system 300 is implemented as a 3GPP LTE network. In other embodiments, wireless communication system 300 is implemented in other ways.

Referring to FIG. 3, wireless communication system 300 includes mobile station 302 and a base station 304. Mobile station 302 includes a paging module 306, a sleep module 308, a transmitter 310, and a receiver 312. Base station 304 includes a receiver 314, a transmitter 316, and a controller 318.

Figure 4:
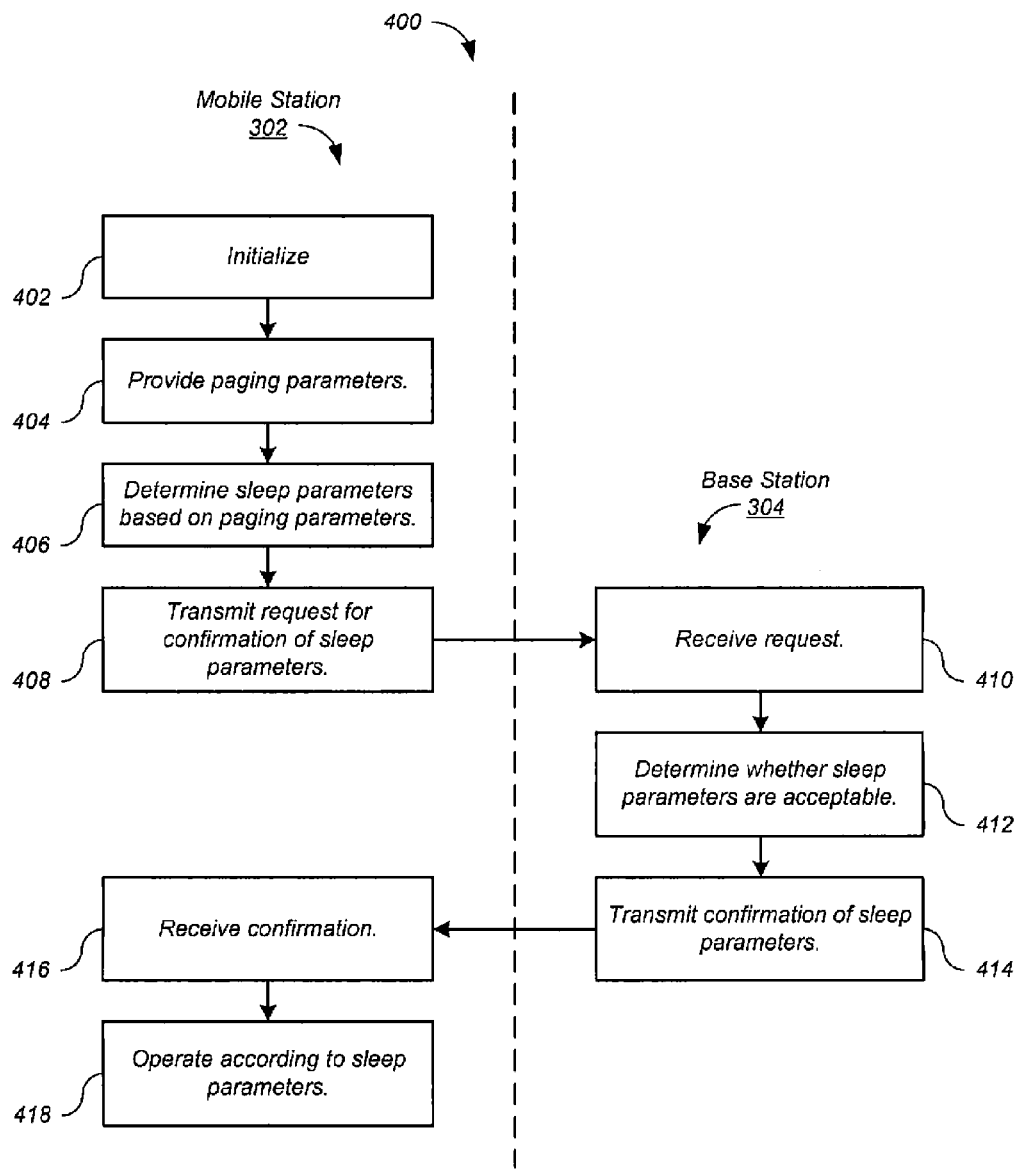
FIG. 4 shows a process operated by the wireless communication system of FIG. 3 according to one embodiment.

FIG. 4 shows a process 400 operated by wireless communication system 300 of FIG. 3 according to one embodiment. Although in the described embodiments the elements of process 400 are presented in one arrangement, other embodiments may feature other arrangements. For example, in various embodiments, some or all of the steps of process 400 can be executed in a different order, concurrently, and the like.

In FIG. 4, processes of mobile station 302 are shown on the left, while processes of base station 304 are shown on the right. Process 400 begins at 402 where mobile station 302 is initialized, for example when powered on by a user. At 404 paging module 306 provides paging parameters for mobile station 302.

The paging parameters include a paging listening interval length Lp for each paging listening interval, a paging cycle period Pp, and a paging cycle offset Qp. Paging listening interval length Lp is generally fixed for a given wireless communication system 300. Paging cycle period Pp and paging cycle offset Qp are generally determined based on paging requirements such as delay and system parameters such as the total number of mobile stations 302. Paging cycle period Pp is generally common among the mobile stations 302 within a cell. Paging cycle offset Qp is generally common among a group of mobile stations 302, but may be different for each group when multiple groups are present.

At 406, sleep module 308 determines sleep parameters for mobile station 302 based on the paging parameters. The sleep parameters include a wakeup interval length Ls for each wakeup interval, a sleep cycle period Ps, and a sleep cycle offset Qs. To ensure that each paging listening interval 104 overlaps one of wakeup intervals 110, sleep module 308 determines the sleep parameters according to equation (5), where k is a positive integer.

$$Pp/Ps = k \qquad (5)$$

To ensure that the end of each paging listening interval 104 is aligned with the end of one wakeup intervals 110, sleep module 308 determines the sleep parameters according to equation (6), where m is a positive integer.

$$0 \leq Qs = Qp + Lp - Ls + mPs < Ps \qquad (6)$$

At 408, transmitter 310 of mobile station 302 transmits a message 320 representing a request for base station 304 to confirm the sleep parameters. At 410 receiver 314 of base station 304 receives message 320. At 412, controller 318 of base station 304 determines whether the sleep parameters are acceptable. If controller 318 determines the sleep parameters to be acceptable, at 414 transmitter 316 of base station 304 transmits a message 322 representing a confirmation of the sleep parameters. At 416 receiver 314 of mobile station 302 receives message 322. At 418 mobile station 302 operates according to the sleep parameters.

Figure 5:
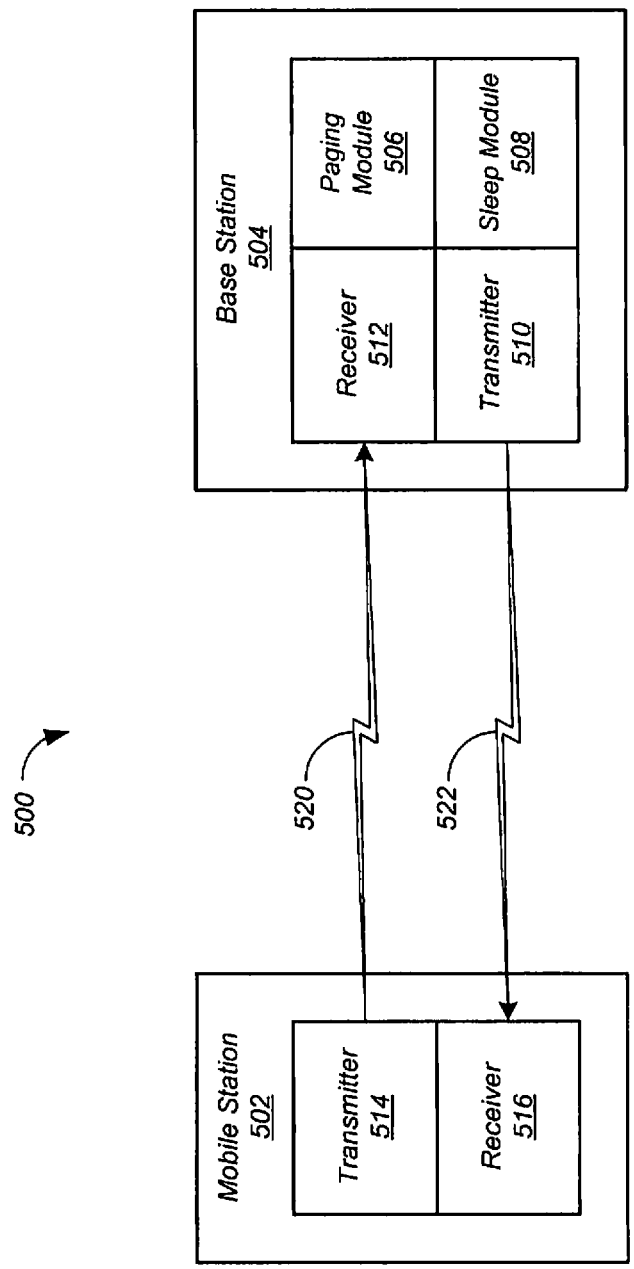
FIG. 5 shows elements of a wireless communication system according to an embodiment where a base station selects sleep parameters for a mobile station.

FIG. 5 shows elements of a wireless communication system 500 according to an embodiment where a base station 504 selects sleep parameters for a mobile station 502. Although in the described embodiments the elements of wireless communication system 500 are presented in one arrangement, other embodiments may feature other arrangements. For example, elements of wireless communication system 500 can be implemented in hardware, software, or combinations thereof.

Referring to FIG. 5, wireless communication system 500 includes mobile station 502 and base station 504. Base station 504 includes a paging module 506, a sleep module 508, a transmitter 510, and a receiver 512. Mobile station 502 includes a transmitter 514 and a receiver 516.

Figure 6:
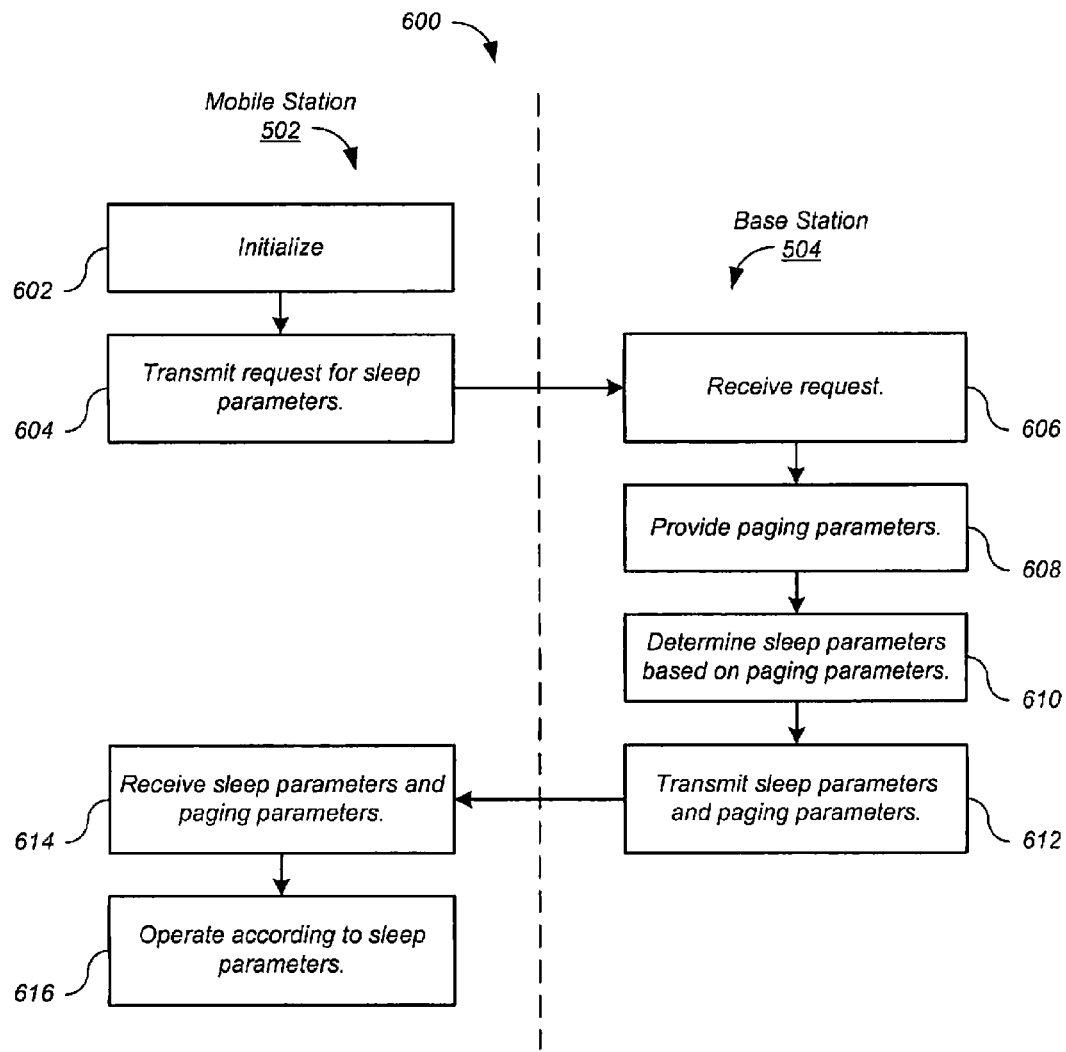
FIG. 6 shows a process operated by the wireless communication system of FIG. 5 according to one embodiment.

FIG. 6 shows a process 600 operated by wireless communication system 500 of FIG. 5 according to one embodiment. Although in the described embodiments the elements of process 600 are presented in one arrangement, other embodiments may feature other arrangements. For example, in various embodiments, some or all of the steps of process 600 can be executed in a different order, concurrently, and the like.

In FIG. 6, processes of mobile station 502 are shown on the left, while processes of base station 504 are shown on the right. Process 600 begins at 602 where mobile station 502 is initialized, for example when powered on by a user. At 604, transmitter 514 of mobile station 502 transmits a message 520 representing a request for sleep parameters. At 606 receiver 512 of base station 504 receives message 520.

At 608 paging module 506 of base station 504 provides paging parameters for mobile station 502. At 610, sleep module 508 determines sleep parameters for mobile station 502 based on the paging parameters. The paging parameters and sleep parameters are determined as described above.

At 612, transmitter 510 of base station 504 transmits a message 522 representing the sleep parameters and paging parameters. At 614 receiver 516 of mobile station 502 receives message 522. At 616 mobile station 502 operates according to the sleep parameters.

Other embodiments are contemplated. For one example, the paging parameters can be determined by one or both of mobile station 502 and base station 504. For another example, base station 504 can provide paging and sleep parameters without the explicit request at 604 of mobile station 502. Various embodiments are independent of the manner in which the paging parameters are selected.

Now example parameters are described for a 3GPP LTE network. In a 3GPP LTE network, the parameters are determined by base station 304, which is referred to as the evolved Node B (eNB), and transmitted to mobile station 302, which is referred to as the user equipment (UE). The period of the paging cycle $Pp$ can be 320, 640, 1280, or 2560 ms. The period of the sleep cycle $Ps$ can be 10, 20, 32, 40, 64, 80, 128, 160, 256, 320, 512, 640, 1024, 1280, 2048, or 2560 ms. The paging listening interval $Lp$ is 1 ms. The length of the wakeup interval $Ls$ can be 1, 2, 3, 4, 5, 6, 8, 10, 20, 30, 40, 50, 60, 80, 100, or 200 ms. The offset of the paging cycle $Qp$ is a function of the unique identification number $UE\_ID$ of the UE. The offset of the sleep cycle $Qs$ can be any non-negative integer less than the period of the sleep cycle $Ps$.

Now an example of the selection of sleep parameters is described for a 3GPP LTE network. As mentioned above, the paging listening interval $Lp$ is fixed at 1 ms. The eNB chooses the period of the paging cycle $Pp$ based on its paging requirements, for example, $Pp=1280$ ms. The eNB and UE calculate the offset of the paging cycle $Qp$ based on the $UE\_ID$, for example, $Qp=10$ ms. The eNB chooses the wakeup interval $Ls$ based on its sleep requirements, for example, $Ls=4$ ms. The eNB chooses the period of the sleep cycle $Ps$ based on the already-chosen period of the paging cycle $Pp$ and an equation, for example, $Ps=Pp/4=320$ ms. The eNB chooses the offset of the sleep cycle $Qs$ based on the already-chosen parameters and equations, for example, $Qs=Qp+Lp-Ls+m*Ps=10+1-4+0*320=7$ ms.

Various embodiments can be implemented in digital electronic circuitry, or in computer hardware, firmware, software, or in combinations of them. Embodiments can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. For example, one or more steps of methods described above can be performed in a different order (or concurrently) while still achieving desirable results. Accordingly, other implementations are within the scope of the following claims.

What is claimed is:

1. An apparatus comprising:
a paging module configured to provide a plurality of paging parameters for a mobile station, wherein the paging parameters include i) a length of each of a plurality of paging listening intervals, and ii) a paging cycle offset; and
a sleep module configured to determine each of a plurality of sleep parameters for the mobile station based on the plurality of paging parameters, wherein the plurality of sleep parameters include i) a length of each of a plurality of wakeup intervals, ii) a sleep cycle period, and iii) a sleep cycle offset; and
wherein the sleep module is configured to determine the plurality of sleep parameters such that each of the plurality of paging listening intervals is synchronized with and occurs during a respective one of the plurality of wakeup intervals,
wherein the sleep module is further configured to determine the plurality of sleep parameters such that the sleep cycle offset is (i) greater than or equal to zero and (ii) equal to a sum of
the paging cycle offset,
the paging listening interval length, an inverse of the length of each of a plurality of wakeup intervals, and a product of (a) a positive integer, and (b) the sleep cycle period, and wherein the sum is less than the sleep cycle period.

2. The apparatus of claim 1, wherein:

the plurality of paging parameters include a paging cycle period; and the sleep module is configured to determine the plurality of sleep parameters such that the paging cycle period divided by the sleep cycle period is a positive integer.

3. The apparatus of claim 1, wherein the sleep module is configured to determine the plurality of sleep parameters such that an end of each of the plurality of paging listening intervals occurs at an end of a respective one of the plurality of wakeup intervals.

4. The mobile station of claim 3, comprisingthe apparatus of claim 3.

5. The mobile station of claim 4, further comprising a transmitter configured to transmit a first message, wherein the first message requests for a base station to confirm the plurality of sleep parameters, wherein:

the mobile station is configured to, subsequent to receiving a second message from the base station, operate according to the plurality of sleep parameters; and the second message confirms the plurality of sleep parameters.

6. A base station comprising the apparatus of claim 3.

7. The base station of claim 6, further comprising a transmitter configured to transmit a message, wherein:

the message includes the plurality of sleep parameters; and the mobile station is configured to, subsequent to receiving the message, operate according to the plurality of sleep parameters.

8. An apparatus comprising:

a paging module configured to provide paging parameters for a mobile station, wherein the paging parameters include i) a paging listening interval length Lp for each paging listening interval, ii) a paging cycle period Pp, and iii) a paging cycle offset Qp; and a sleep module configured to determine sleep parameters for the mobile station based on the paging parameters, wherein the sleep parameters include i) a wakeup interval length Ls for each wakeup interval, ii) a sleep cycle period Ps, and iii) a sleep cycle offset Qs, wherein the sleep module is further configured to determine the sleep parameters such that each paging listening interval overlaps one of the wakeup intervals, wherein the sleep module is further configured to determine the sleep parameters such that an end of each paging listening interval is aligned with an end of one of the wakeup intervals, and wherein the sleep module is further configured to determine the sleep parameters such that $0 \leq Qs=Qp+Lp-Ls+mPs<Ps$, wherein m is a positive integer.

9. A method comprising:

providing a plurality of paging parameters for a mobile station, wherein the plurality of paging parameters include i) a length of each of a plurality of paging listening intervals, and ii) a paging cycle offset; and determining each of a plurality of sleep parameters for the mobile station based on the plurality of paging parameters, wherein the plurality of sleep parameters include i) a length of each of a plurality of wakeup intervals, ii) a sleep cycle period, and iii) a sleep cycle offset;

wherein the plurality of sleep parameters are determined such that each of the plurality of paging listening intervals is synchronized with and occurs during a respective one of the plurality of wakeup intervals; and determining the plurality of sleep parameters such that the sleep cycle offset is (i) greater than or equal to zero and (ii) equal to a sum of the paging cycle offset, the paging listening interval length, an inverse of the length of each of a plurality of wakeup intervals, and a product of (a) a positive integer, and (b) the sleep cycle period, and wherein the sum is less than the sleep cycle period.

10. The method of claim 9, further comprising determining the plurality of sleep parameters such that a paging cycle period divided by the sleep cycle period is a positive integer, wherein the paging parameters include the paging cycle period.

11. The method of claim 9, further comprising determining the plurality of sleep parameters such that an end of each of the plurality of paging listening intervals occurs at an end of a respective one of the plurality of wakeup intervals.

12. The method of claim 11, wherein the method further comprises transmitting a first message from the mobile station to a base station, wherein the first message requests confirmation of the plurality of sleep parameters, wherein:

the mobile station, subsequent to receiving a second message from the base station, is configured to operate according to the plurality of sleep parameters; and the second message confirms the plurality of sleep parameters.

13. The method of claim 11, wherein the method further comprises transmitting a message from a base station to the mobile station, wherein:

the message includes the plurality of sleep parameters; and the mobile station is configured to, subsequent to receiving the message, operate according to the plurality of sleep parameters.

14. A method comprising:

providing paging parameters for a mobile station, wherein the paging parameters include i) a paging listening interval length Lp for each paging listening interval, ii) a paging cycle period Pp, and iii) a paging cycle offset Qp;

determining sleep parameters for the mobile station based on the paging parameters, wherein the sleep parameters include i) a wakeup interval length Ls for each wakeup interval, ii) a sleep cycle period Ps, and iii) a sleep cycle offset Qs, wherein the sleep parameters are determined such that each paging listening interval overlaps one of the wakeup intervals;

determining the sleep parameters such that an end of each paging listening interval is aligned with an end of one of the wakeup intervals; and determining the sleep parameters such that $0 \leq Qs=Qp+Lp-Ls+mPs<Ps$, wherein m is a positive integer.

15. A non-transitory computer-readable medium storing instructions executable by a computer, wherein the instructions comprise:

providing paging parameters for a mobile station, wherein the paging parameters include i) a length of each of a plurality of paging listening intervals, and ii) a paging cycle offset; and determining each of a plurality of sleep parameters for the mobile station based on the paging parameters, wherein the plurality of sleep parameters include i) a length of each of a plurality of wakeup intervals, ii) a sleep cycle period, and iii) a sleep cycle offset, wherein the plurality of sleep parameters are determined such that each of the plurality of paging listening intervals is synchronized with and occurs during a respective one of the plurality of wakeup intervals; and determining the plurality of sleep parameters such that the sleep cycle offset is (i) greater than or equal to zero and (ii) equal to a sum of the paging cycle offset, the paging listening interval length, an inverse of the length of each of a plurality of wakeup intervals, and a product of (a) a positive integer, and (b) the sleep cycle period, and wherein the sum is less than the sleep cycle period.

16. The non-transitory computer-readable medium of claim 15, wherein:

the instructions further comprise determining the plurality of sleep parameters such that a paging cycle period divided by the sleep cycle period is a positive integer; and the paging parameters include the paging cycle period.

17. The non-transitory computer-readable medium of claim 15, wherein the instructions further comprise determining the plurality of sleep parameters such that an end of each of the plurality of paging listening intervals occurs at an end of a respective one of the plurality of wakeup intervals.

18. The non-transitory computer-readable medium of claim 17, wherein the instructions further comprise causing transmission of a first message from the mobile station to a base station, wherein the first message requests confirmation of the plurality of sleep parameters, wherein:

the mobile station is configured to, subsequent to receiving a second message from the base station, operate according to the plurality of sleep parameters; and the second message confirms the plurality of sleep parameters.

19. The non-transitory computer-readable medium of claim 17, wherein the instructions further comprise causing transmission of a message to the mobile station, wherein:

the message includes the plurality of sleep parameters; and the mobile station is configured to operate, subsequent to receiving the message, according to the plurality of sleep parameters.

\* \* \* \* \*